United States Patent
Ko et al.

(10) Patent No.: US 11,961,015 B2
(45) Date of Patent: *Apr. 16, 2024

(54) SYSTEM, METHOD, AND RECORDING MEDIUM FOR DISTRIBUTED PROBABILISTIC EIDETIC QUERYING, ROLLBACK, AND REPLAY

(71) Applicant: International Business Machines Corporation, Armonk, NY (US)

(72) Inventors: Bong Jun Ko, Harrington Park, NJ (US); Christian Makaya, Yorktown Heights, NY (US); Jorge J. Ortiz, Yorktown Heights, NY (US); Swati Rallapalli, Ossining, NY (US); Dinesh C. Verma, New Castle, NY (US); Xiping Wang, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 130 days.

This patent is subject to a terminal disclaimer.

(21) Appl. No.: 17/319,210

(22) Filed: May 13, 2021

(65) Prior Publication Data
US 2021/0271998 A1 Sep. 2, 2021

Related U.S. Application Data

(63) Continuation of application No. 15/186,758, filed on Jun. 20, 2016, now Pat. No. 11,055,623.

(51) Int. Cl.
*G06N 7/01* (2023.01)
*G06F 16/28* (2019.01)
(Continued)

(52) U.S. Cl.
CPC ............ *G06N 7/01* (2023.01); *G06F 16/285* (2019.01); *G06F 16/951* (2019.01); *G06N 5/01* (2023.01); *G06N 20/00* (2019.01)

(58) Field of Classification Search
CPC ........ G06N 7/006; G06N 20/00; G06N 5/003; G06F 16/285; G06F 16/951
See application file for complete search history.

(56) References Cited

U.S. PATENT DOCUMENTS

| 5,889,993 A | 3/1999 | Kroeger et al. |
| 5,896,524 A * | 4/1999 | Halstead, Jr. ............. G06F 1/12 |
| | | 713/375 |

(Continued)

FOREIGN PATENT DOCUMENTS

| EP | 0 646 868 A1 | 9/1994 |
| WO | 2012061028 A1 | 5/2012 |

OTHER PUBLICATIONS

Dou, Xianzheng, Jason Flinn, and Peter M. Chen. "Toward eidetic distributed file systems." 7th {USENIX} Workshop on Hot Topics in Storage and File Systems (HotStorage 15). 2015. (Year: 2015).*

(Continued)

*Primary Examiner* — Kevin W Figueroa
(74) *Attorney, Agent, or Firm* — Kristofer Haggerty

(57) ABSTRACT

A provenance method, system, and non-transitory computer readable medium for a plurality of eidetic systems having logs, include crawling the logs of each node of a plurality of nodes of the eidetic systems to cluster segments across the logs of temporally correlated events into clustered segments and analyzing the correlated segments to interleave an order of processes in the logs and assign a probability to the order of the processes occurring.

18 Claims, 6 Drawing Sheets

(51) Int. Cl.
  *G06F 16/951* (2019.01)
  *G06N 5/01* (2023.01)
  *G06N 20/00* (2019.01)

(56) References Cited

U.S. PATENT DOCUMENTS

| | | | |
|---|---|---|---|
| 8,095,830 | B1 | 1/2012 | Cohen |
| 8,468,120 | B2 | 6/2013 | Gupta |
| 8,826,060 | B2 | 9/2014 | Bozak |
| 8,990,335 | B2 | 3/2015 | Fauser |
| 9,298,691 | B2 | 3/2016 | Destefano |
| 11,055,623 | B2 | 7/2021 | Ko |
| 2011/0191394 | A1 | 8/2011 | Winteregg |
| 2013/0332423 | A1* | 12/2013 | Puri .................. G06F 16/35 707/687 |
| 2014/0222994 | A1 | 8/2014 | Castro |
| 2015/0134601 | A1 | 5/2015 | Anderson et al. |
| 2016/0063072 | A1 | 3/2016 | N et al. |
| 2016/0098419 | A1* | 4/2016 | Johnston ............ G06F 11/07 707/797 |
| 2016/0306841 | A1 | 10/2016 | Diaconu et al. |

OTHER PUBLICATIONS

Mel, et al. "The NIST Definition of Cloud Computing". Recommendations of the National Institute of Standards and Technology. Nov. 16, 2015.
Abawajy, Jemal H., et al. "A framework for scalable distributed provenance storage system." Computer Standards & Interfaces 35.1 (2013): 179-186. (Year: 2013).
United States Notice of Allowance dated Feb. 22, 2021, in U.S. Appl. No. 15/186,758.
United States Office Action dated Jan. 21, 2021, in U.S. Appl. No. 15/186,758.
United States Office Action dated Dec. 2, 2020, in U.S. Appl. No. 15/186,758.
United States Office Action dated Aug. 19, 2020, in U.S. Appl. No. 15/186,758.
United States Office Action dated Apr. 22, 2020, in U.S. Appl. No. 15/186,758.
United States Office Action dated Jan. 31, 2020, in U.S. Appl. No. 15/186,758.
United States Office Action dated Jul. 25, 2019, in U.S. Appl. No. 15/186,758.
United States Office Action dated May 30, 2019, in U.S. Appl. No. 15/186,758.
Jiang, Guofei and Cybenko, George. "Temporal and Spatial Distributed Event Correlation for Network Security". 2004 American Control Conference. Boston, MA. Jun. 30, 2004.
Altekar et al., "ODR: Output-Deterministic Replay for Multicore Debugging," ACM, SOSP'09, Oct. 11-14, 2009, https://www.sigops.org/s/conferences/sosp/2009/papers/altekar-sosp09.pdf, 14 pages.
Devecsery et al., "Eidetic Systems," Proceedings of the 11th USENIX Symposium on Operating Systems Design and Implementation, Oct. 6-8, 2014, https://www.usenix.org/system/files/conference/osdi14/osdi14-paper-devecsery.pdf, 17 pages.
Dunlap et al., ReVirt: Enabling Intrusion Analysis through Virtual-Machine Logging and Replay, Proceedings of the 2002 Symposium on Operating Systems Design and Implementation (OSDI), Dec. 31, 2002, https://web.eecs.umich.edu/~mosharaf/Readings/ReVirt.pdf, 14 pages.
IBM: List of IBM Patents or Patent Applications Treated as Related. Filed Herewith. 2 pages.
Wikipedia, "Network Time Protocol," Wikipedia—The Free Encyclopedia, Accessed: Oct. 23, 2023, https://en.wikipedia.org/wiki/Network_Time_Protocol, 18 pages.

* cited by examiner

PROVENANCE METHOD 200

160

SYSTEM, METHOD, AND RECORDING MEDIUM FOR DISTRIBUTED PROBABILISTIC EIDETIC QUERYING, ROLLBACK, AND REPLAY

CROSS-REFERENCE TO RELATED APPLICATIONS

The present application is a Continuation Application of U.S. patent application Ser. No. 15/186,758, filed on Jun. 20, 2016, the entire contents of which are hereby incorporated by reference.

BACKGROUND

The present invention relates generally to a provenance system, and more particularly, but not by way of limitation, to a system for full provenance log inspection across machines and answers probabilistic lineage queries, allowing the users to crawl all possible histories with no log messages being exchanged between machines.

Enterprises are increasingly interested in the area of data provenance, which involves tracking the lineage of data in a computing system. Understanding the pedigree of data is important when determining whether to trust that data, a process that is involved in many enterprise activities such as maintaining data retention compliance, audits of business processes, and tracking data security. Provenance assists in understanding how data evolves; provenance systems can keep information about how data is created, transformed, and replicated across different nodes in a distributed system.

In conventional provenance systems, the provenance tracking capability is deliberately added as a data management system that runs in parallel with the system being observed. Access to the internals of the observed systems is needed to insert tracking code that is specifically configured for the system. In some cases, provenance tracking can be accomplished with less-invasive integration, e.g. tracking provenance gained from observing network traffic. However, this is limited in scope, such that more invasive approaches are needed to collect detailed provenance information that is potentially required, e.g. tracking the version history of a data item that is never sent over a network.

Other conventional techniques consider event data correlated with other events including events at other nodes using a timestamp. The correlated events are sorted to generate a relative time sequence of the events, which can be used to trace, track, and debug the events without requiring synchronization among all of the clocks of all of the nodes of the distributed computing system.

However, there is a technical problem in the conventional techniques in that there is a forced deterministic order even when the deterministic order cannot be established, thereby failing to consider a situation where the ordering cannot be determined and thus making the techniques only operable to traverse a single timeline.

SUMMARY

In view of the technical problem, the inventors have considered a non-abstract improvement to a computer technology via a technical solution to the technical problem in which a provenance system can be conditioned on an output of a log and through observation update out posterior probability for each set of events, by serializing these sets for traversal, either for replay, rollback, or to play a different timeline altogether such that no log messages are exchanged between machines. The system enables full provenance log inspection across machines and answers probabilistic lineage queries, allowing the users to crawl all possible histories.

In an exemplary embodiment, the present invention can provide a provenance system for a plurality of eidetic systems having logs, the system including a log-segment clustering circuit configured to crawl the logs of each of the eidetic systems to cluster segments across the logs of temporally correlated events into clustered segments, a probabilistic interleaving circuit configured to analyze the correlated segments to interleave an order of processes in the logs and assign a probability to the order of the processes occurring, and a probabilistic linearization circuit configured to create a probability tree which includes a total probability that a process in the clustered segments causes a next process in the clustered segments until an end of the temporal event of the clustered segments for each of the interleaved order of processes interleaved by the probabilistic interleaving circuit.

Further, in another exemplary embodiment, the present invention can provide a provenance method for a plurality of eidetic systems having logs, the method including clustering segments across the logs of temporally correlated events into clustered segments by crawling the logs of each of the eidetic systems, interleaving an order of processes in the logs to assign a probability of the order of the processes occurring, and creating a probability tree which includes a total probability that a process in the clustered segments causes a next process in the clustered segments until an end of the temporal event of the clustered segments for each of the interleaved order of processes by the interleaving.

Even further, in another exemplary embodiment, the present invention can provide a non-transitory computer-readable recording medium recording a provenance program for a plurality of eidetic systems having logs, the program causing a computer to perform: clustering segments across the logs of temporally correlated events into clustered segments by crawling the logs of each of the eidetic systems, interleaving an order of processes in the logs to assign a probability of the order of the processes occurring, and creating a probability tree which includes a total probability that a process in the clustered segments causes a next process in the clustered segments until an end of the temporal event of the clustered segments for each of the interleaved order of processes by the interleaving.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF THE EXEMPLARY EMBODIMENTS

Figure 1:
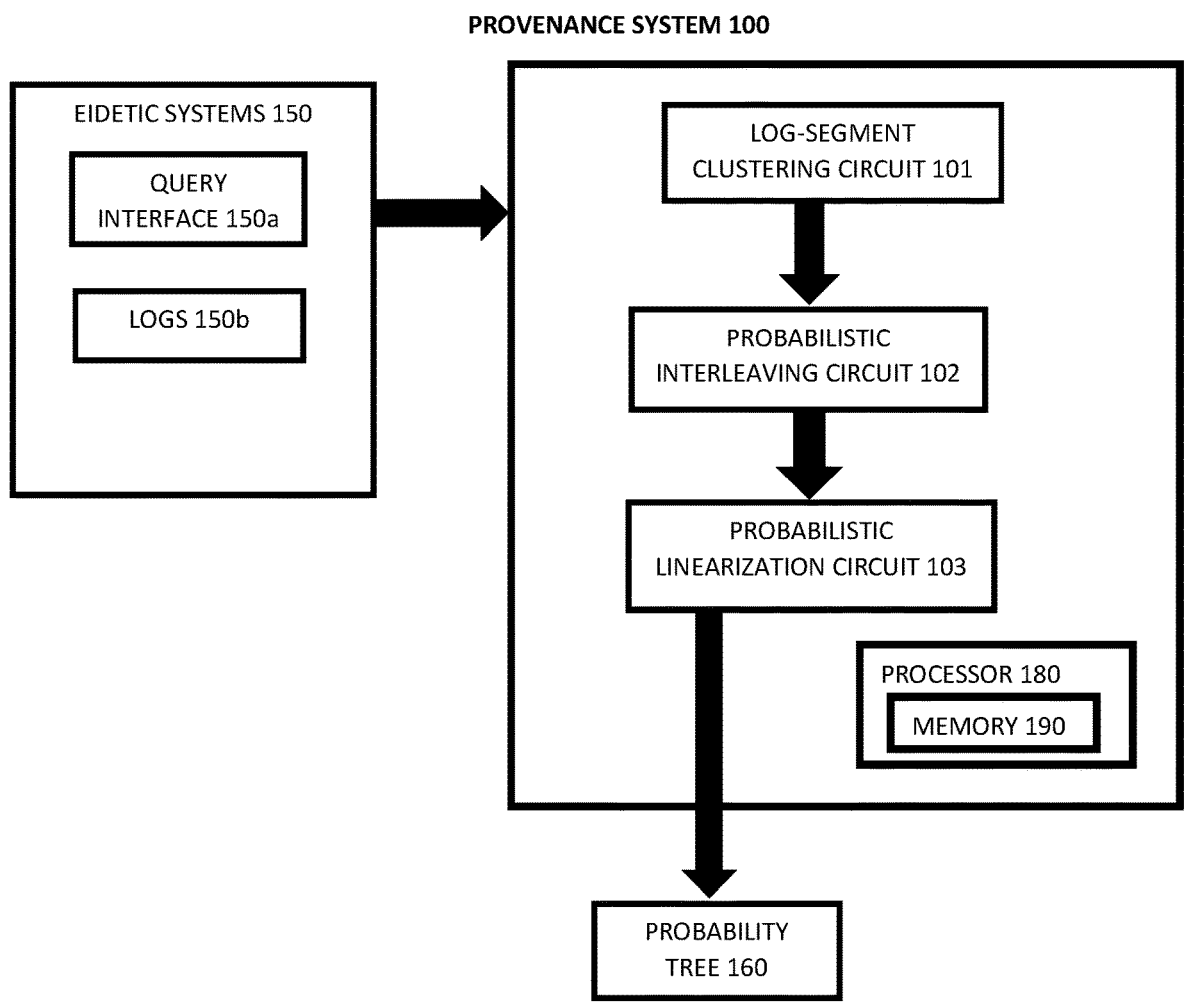
FIG. 1 exemplarily shows a block diagram illustrating a configuration of a provenance system 100.

The invention will now be described with reference to FIGS. 1-6, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the provenance system 100 includes a log-segment clustering circuit 101, a probabilistic interleaving circuit 102, and a probabilistic linearization circuit 103. The provenance system 100 includes a processor 180 and a memory 190, with the memory 190 storing instructions to cause the processor 180 to execute each circuit of the provenance system 100. The processor and memory may be physical hardware components, or a combination of hardware and software components.

The provenance system 100 enables probabilistic lineage queries for a set of single-node eidetic systems 150 to combine their logs, probabilistically, so that an end user can query, rollback, and/or replay any possible history of their distributed system using the generated probability tree 160. The provenance system 100 includes a collection of nodes, each logging all events occurring locally, and examines the logs of all such systems, combines their logs and considers a probabilistically sequential ordering of correlated and dependent events. With such an ordering, the end user can query the provenance system 100 to determine the possible causal paths between events on different systems, could rollback those events—picking whichever possible path the system constructs—and replay the events for diagnosis.

Although the provenance system 100 includes various circuits, it should be noted that a provenance system can include modules in which the memory 190 stores instructions to cause the processor 180 to execute each module of the provenance system 100.

Also, each circuit can be a stand-alone device, unit, module, etc. that can be interconnected to cooperatively produce a transformation to a result.

Figure 3:
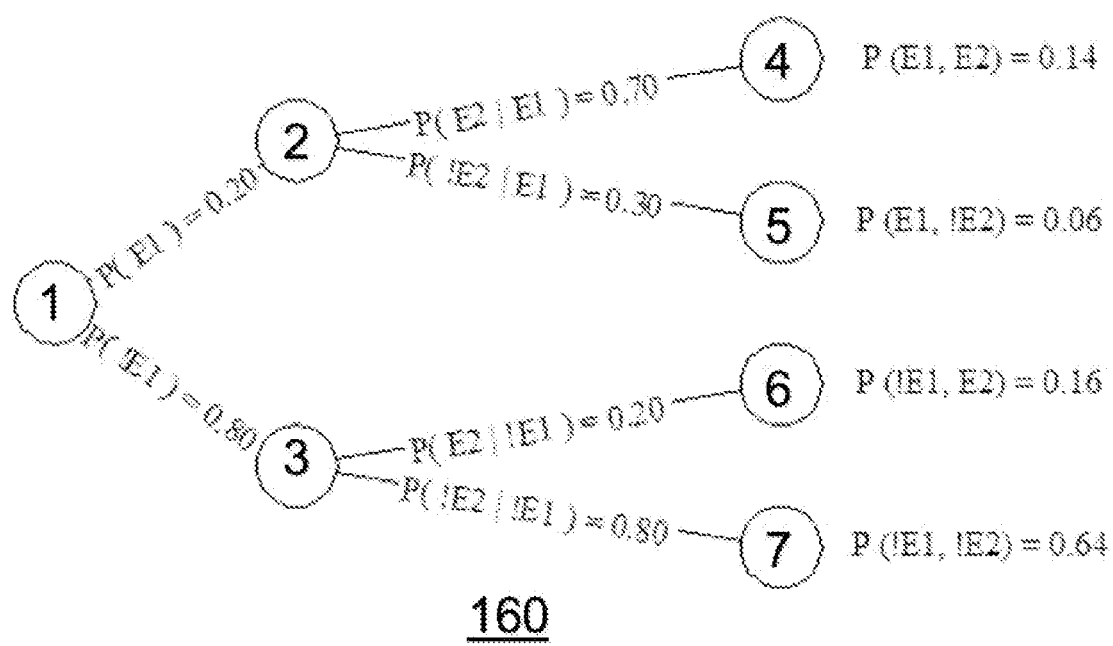
FIG. 3 exemplarily shows a probability tree 160 output from the provenance system 100.
Figure 4:
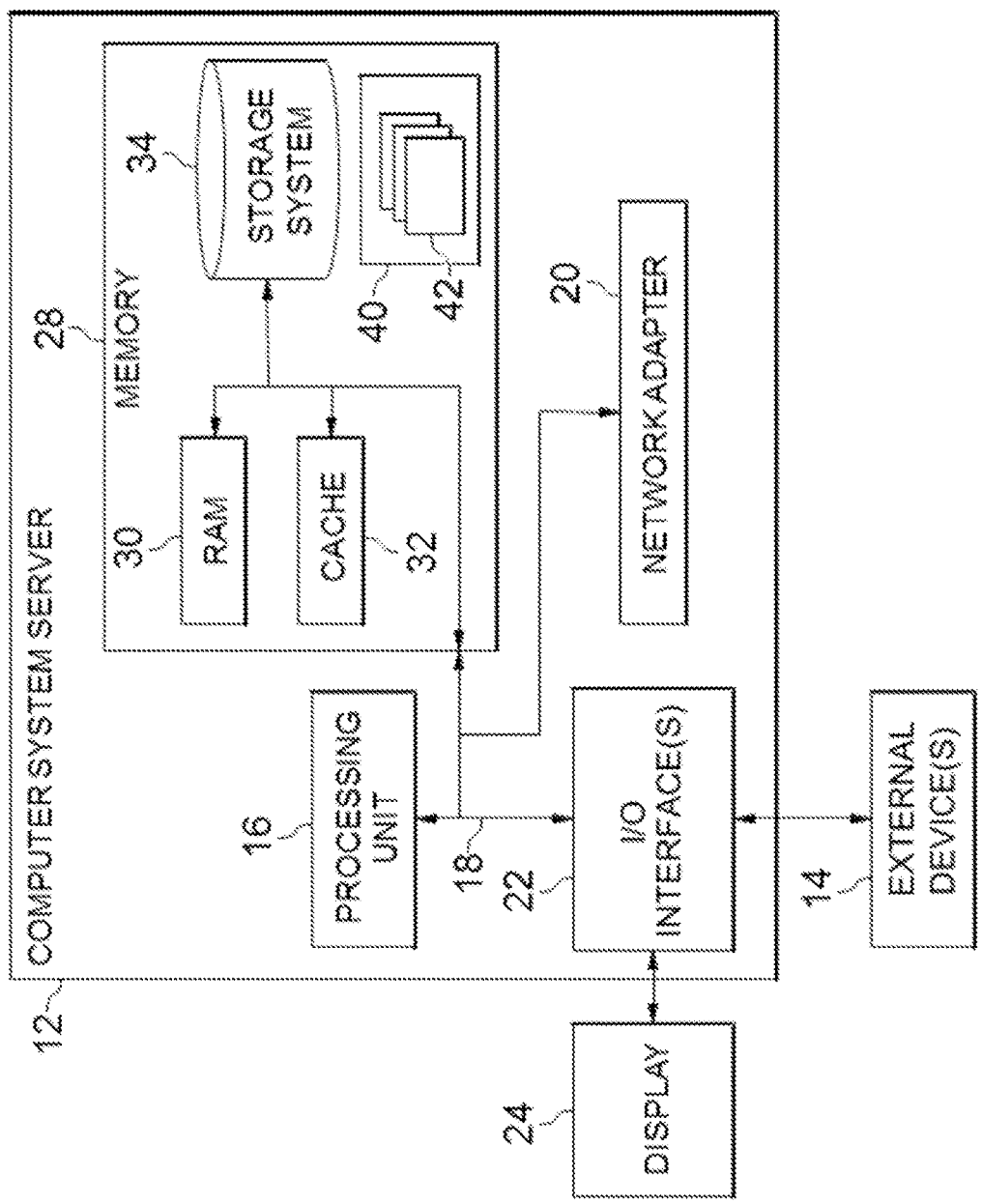
FIG. 4 depicts a cloud computing node 10 according to an exemplary embodiment of the present invention.
Figure 5:
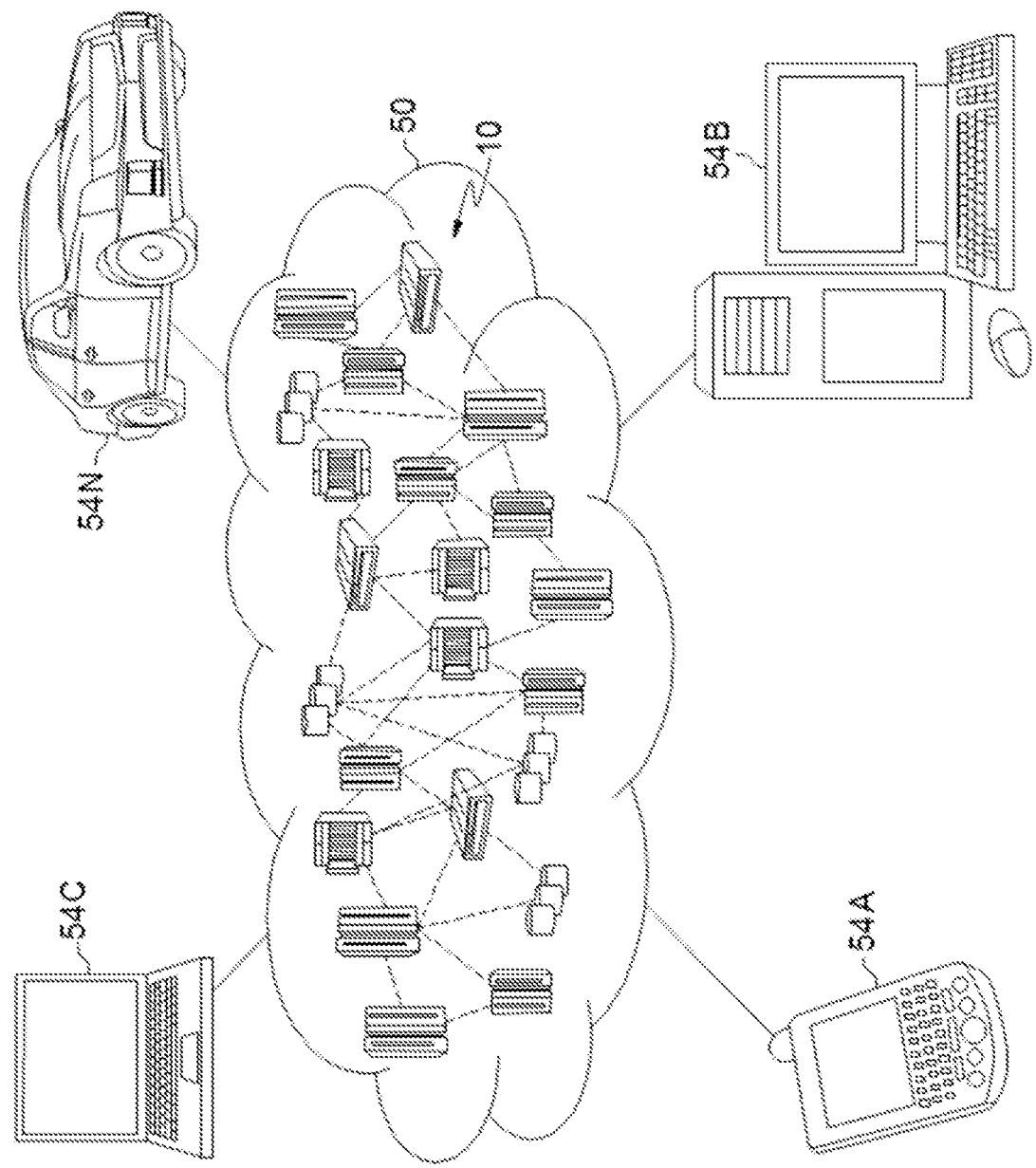
FIG. 5 depicts a cloud computing environment 50 according to another exemplary embodiment of the present invention.

Although as shown in FIGS. 3-5 and as described later, the computer system/server 12 is exemplarily shown in cloud computing node 10 as a general-purpose computing circuit which may execute in a layer the provenance system 100 (FIG. 5), it is noted that the present invention can be implemented outside of the cloud environment.

Each eidetic system of the eidetic systems 150 includes a query interface 150a and logs 150b which are produced by each of the eidetic systems. The query interface 150a communicates the logs 150b to the provenance system 100.

The log-segment clustering circuit 101 includes a crawler that mines the received logs 150b looking for segments within the logs 150b that temporally correlate with segments in the other nodes in the cluster. That is, the log-segment clustering circuit 101 crawls the logs 150b to correlate segments of logs that are causally linked. These segments can be found and grouped together using correlations and statistical techniques. These constitute instances of correlated events across nodes in the eidetic systems 150 cluster.

For example, if a first eidetic system 150 has process A in its logs 150b at time_0, and a second eidetic system 150 has process B in its logs 150b at time_1 which was causally linked to process A of the first eidetic system 150, and a third eidetic system 150 has process C in its logs 150 at time_1 which was causally linked to process A of the first eidetic system 150, the log-segment clustering circuit 101 groups these correlated segments of the logs 150b together (e.g., process A caused process B and process A caused process C).

The probabilistic interleaving circuit 102 analyzes the groups of the correlated segments from the log-segment clustering circuit 101 to interleave the order of the processes in the logs and the probability that the orders occur. For example, the probabilistic interleaving circuit 102 will analyze all of the groups and determine a probability that process A causes process B, a probability that process A sometimes causes process C, etc.

That is, each process A of the logs 150b of the group is examined and the probability of the next process occurring because of process A is determined. As another example, if there are one-hundred logs 150b in the group with twenty logs having process A causing process B and eighty logs having process A causing process C, the probabilistic interleaving circuit 102 determines that there is an eighty percent probability that process A causes process C and a twenty percent probability that process A causes process B.

The probabilistic interleaving circuit 102 interleaves all the probabilities for the correlated causal processes of the segments such that the probabilistic interleaving circuit 102 creates the probabilities that the clustered groups that were correlated together are causing another action within the logs 150b to occur.

The probabilistic interleaving circuit 102 can examine the timestamps across the logs and determining a possible interleaving by, for example, continuously performing a clock-drift analysis between the system 100 and each of the individual eidetic systems 150. Network time protocol (NTP) techniques can be used.

That is, after the probabilistic interleaving circuit 102 calculates the drift, pair-wise between the system 100 and each individual node in the cluster, the probabilistic interleaving circuit 102 can translate a timestamp in the log entry for each correlation block into the local time on the system 100. Thereby, the probabilistic interleaving circuit 102 determines a partial ordering of the causal correlated logs.

Once the entries in the cluster have been interleaved by the probabilistic interleaving circuit 102, a global, probabilistic ordering (e.g., a probability tree 160 as shown in FIG. 1 and FIG. 3) is constructed by the probabilistic linearization circuit 103. The probabilistic linearization circuit 103 creates a probability tree 160 that includes the probability that a process in the segments causes a next process until the end of the segment for each and every interleaved process.

For example, as shown in FIG. 3, node "1" exemplifies process A of the first eidetic system 100 and node 2 exemplifies that there is an eighty percent probability that process A of the first eidetic system 150 causes process C of the third eidetic system 150 (e.g., node "3" of the tree 160) and that there is a twenty percent probability that process A causes process B of the second eidetic system 150 (e.g., node "2" of the tree 160). From node "2", the probabilistic interleaving circuit 102 determines that there was a seventy percent change that a process D follows process B (e.g., node "4" of the tree 160) and a thirty percent chance that process E followed process B (e.g., node "5" of the tree 160) and the probabilistic linearization circuit 103 forms the nodes "4" and "5" on the tree 160 accordingly. From node "3", the probabilistic interleaving circuit 102 determines that there was a twenty percent change that a process F follows process C (e.g., node "6" of the tree 160) and an eighty percent chance that process G follows process C (e.g., node "7" of the tree 160) and the probabilistic linearization circuit 103 forms the nodes "6" and "7" on the tree 160 accordingly.

As shown in FIG. 3, there is a fourteen percent probability that the process A causes process B then process D, a six percent chance that process A causes process B then process E, there is a sixteen percent chance that process A causes process C then process F, and a sixty-four percent chance that process A causes process C then process G Thus, the probability tree 160 created by the probabilistic linearization circuit 103 can be used to answer probabilistic lineage queries about what caused specific events to occur. Further, the probability tree 160 can also be used to 'walk' the history of events via a rollback of the events so they occur in the specified order, or a replay the events along a particular path in the tree 160 or pick a different history and rollback(replay) that history instead.

Therefore, an administrator can see each and every potential process pathing (and the probabilities associated therewith) to troubleshoot in a distributed node setting instead of only using the path of the highest probability. As such, there is more information on an error, and for example, hard-to-find (e.g., temporal bugs) can be found and determined.

Thereby, the system 100 can efficiently analyze a high degree of chum in network availability or unreliable nodes even if the nodes are not the most probable paths of the eidetic systems 150. Since the logs are scanned periodically and the tree 160 is probabilistically constructed, it is more robust to failures. The probabilities could be updated and re-computed as nodes/links enter or leave the cluster. Also, logs could be scanned locally and correlation analysis could be anonymized.

It is noted that large logs could he scanned and in parallel and correlated in a continuous, streaming fashion. Or, optimization could be made in filling in the gaps in event logs and using prior log correlations to generate missing logs from nodes that are temporarily down or unreachable. The probabilities actual patterns could be corrected after the node becomes reachable.

Also, all of the logs 150 data structure is exposed to the end user by the probabilistic linearization circuit 103 creating the probability tree for each and every interleaved causal correlated process of the group such that the end user (e.g., an administrator) can analyze each and every possible path of the processes. That is, the data structure (e.g., the casual correlations) is not hidden from (i.e., it is exposed to) the end user so the end user can use the data structure.

Figure 2:
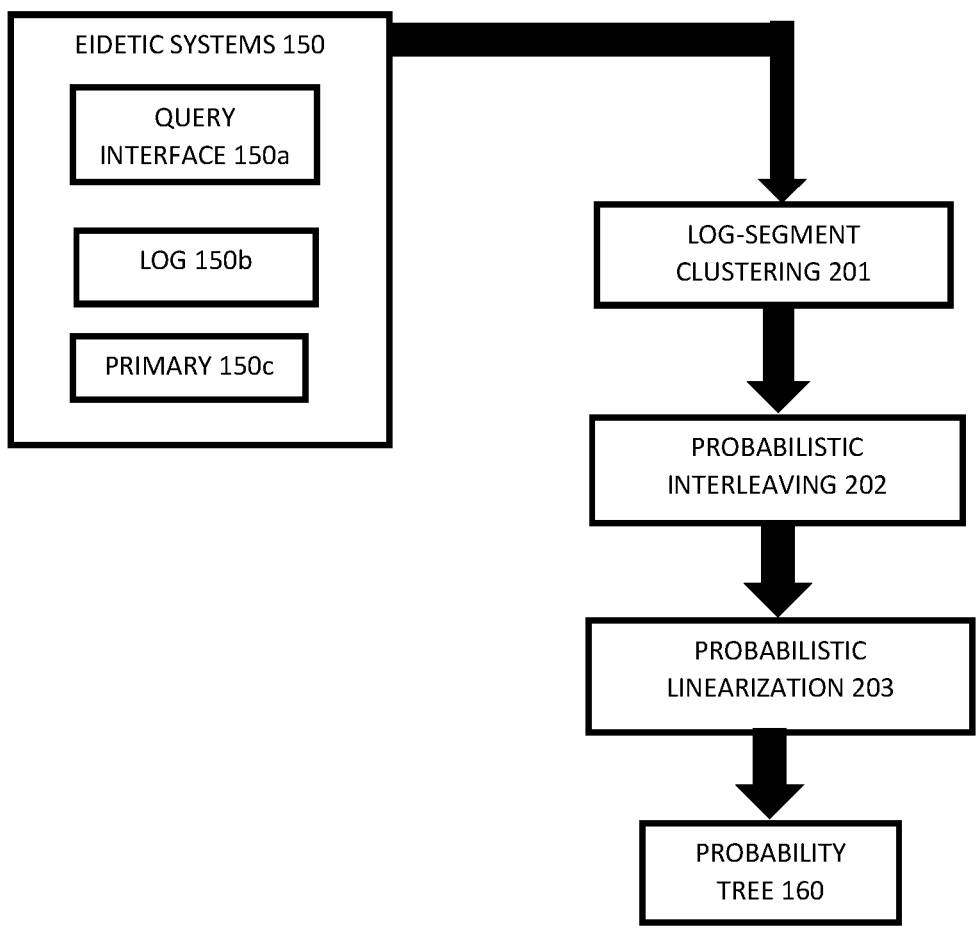
FIG. 2 exemplarily shows a high level flow chart for a provenance method 200.

FIG. 2 shows a high level flow chart for a method 200 of provenance.

Step 201 crawls the logs 150*b* to correlate segments of logs that are causally linked. These segments can be found and grouped together using correlations and statistical techniques. The groups are instances of correlated events across nodes in the eidetic systems 150 cluster.

Step 202 analyzes the groups of the correlated segments from Step 201 to interleave the order of the processes in the logs and the probability that the orders occur.

Step 203 creates a probability tree 160 that includes the probability that a process in the interleaved segments by Step 202 causes a next process until the end of the segment for each and every interleaved process.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 4, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 5, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 8 are intended to be illustrative only and that computing nodes 10 and cloud computing environment 50 can communicate with any type of computerized circuit over any type of network and/or network addressable connection (e.g., using a web browser).

Figure 6:
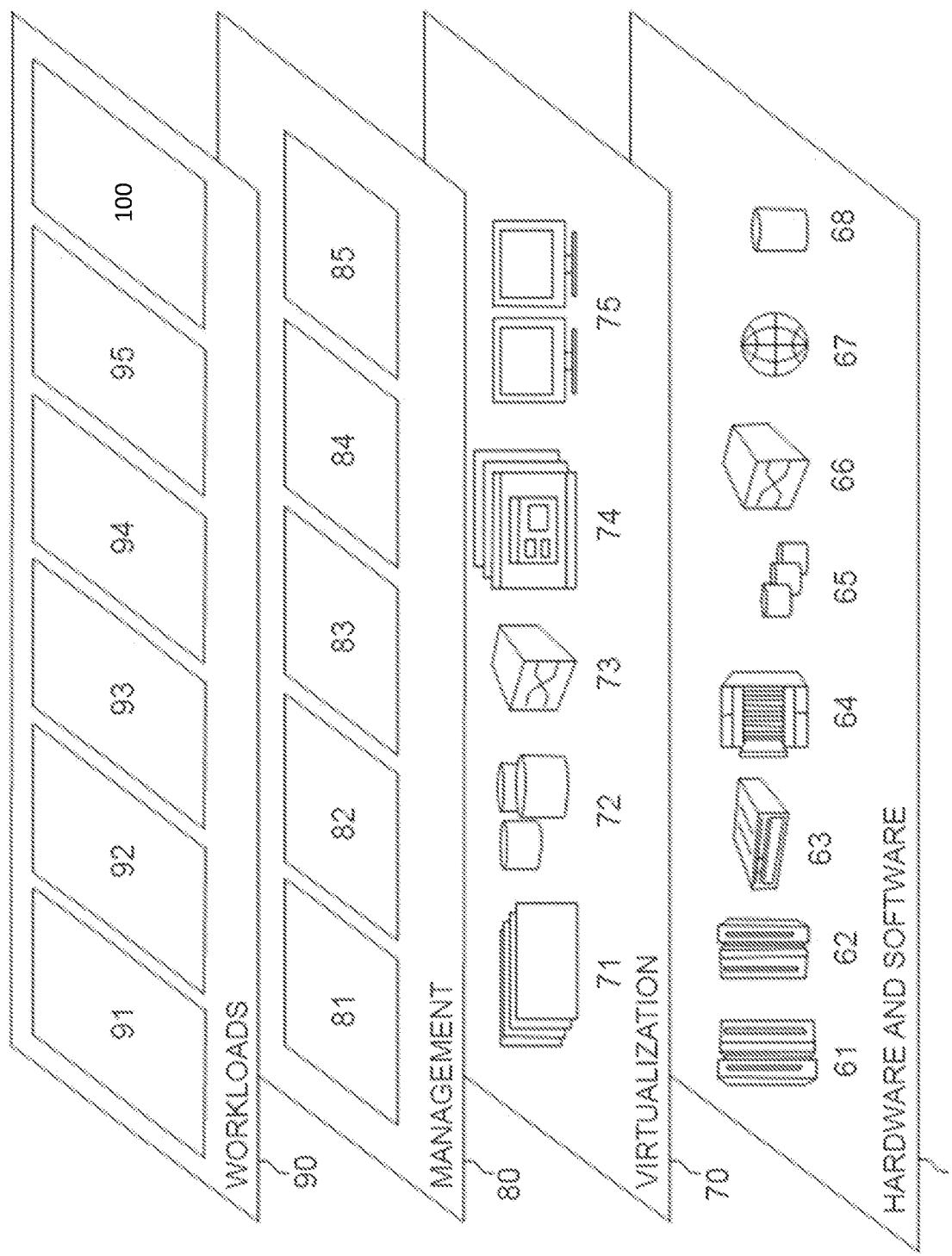
FIG. 6 depicts abstraction model layers according to an exemplary embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the provenance system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:
1. A provenance system for a plurality of eidetic systems having logs, the system comprising:
a processor; and
a memory, the memory storing instructions to cause the processor to perform:
crawling the logs of each node of a plurality of nodes of the eidetic systems to cluster segments across the logs of temporally correlated events into clustered segments; and
analyzing the correlated segments to interleave an order of processes in the logs and assign a probability to the order of the processes occurring while keeping the logs of each node of the plurality of nodes separate to their respective eidetic system,
wherein each node of the plurality of nodes of the eidetic systems independently logs only local events, and
wherein, during the analyzing of the correlated segments, the order of processes in the logs are interleaved using a clock-drift analysis between the provenance system and each of the plurality of eidetic systems, further comprising preventing an exchange of the logs of each of the plurality of eidetic systems to another eidetic system of the plurality of eidetic systems during the crawling by conditioning an output of the logs and, through observation, updating a probability tree for each set of events in the clustered segments by serializing these sets for traversal.

2. The provenance system of claim 1, further comprising, in response to a probabilistic lineage query, allowing a user to crawl all possible histories of the logs based on a result of the analyzing.

3. The provenance system of claim 1, further comprising performing a global ordering of the logs based on a result of the analyzing.

4. The provenance system of claim 1, wherein the sets are serialized for traversal by replay such that the logs of each of the plurality of eidetic systems are not exchanged to another eidetic system of the plurality of eidetic systems during the crawling.

5. The provenance system of claim 1, wherein the sets are serialized for traversal by rollback such that the logs of each of the plurality of eidetic systems are not exchanged to another eidetic system of the plurality of eidetic systems during the crawling.

6. The provenance system of claim 1, wherein the sets are serialized for traversal to play a different timeline such that the logs of each of the plurality of eidetic systems are not exchanged to another eidetic system of the plurality of eidetic systems during the crawling.

7. A provenance method for a plurality of eidetic systems having logs, the method comprising:
   crawling the logs of each node of a plurality of nodes of the eidetic systems to cluster segments across the logs of temporally correlated events into clustered segments; and
   analyzing the correlated segments to interleave an order of processes in the logs and assign a probability to the order of the processes occurring while keeping the logs of each node of the plurality of nodes separate to their respective eidetic system,
   wherein each node of the plurality of nodes of the eidetic systems independently logs only local events, and
   wherein, during the analyzing of the correlated segments, the order of processes in the logs are interleaved using a clock-drift analysis between the provenance system and each of the plurality of eidetic systems,
   further comprising preventing an exchange of the logs of each of the plurality of eidetic systems to another eidetic system of the plurality of eidetic systems during the crawling by conditioning an output of the logs and, through observation, updating a probability tree for each set of events in the clustered segments by serializing these sets for traversal.

8. The provenance method of claim 7, further comprising, in response to a probabilistic lineage query, allowing a user to crawl all possible histories of the logs based on a result of the analyzing.

9. The provenance method of claim 7, further comprising performing a global ordering of the logs based on a result of the analyzing.

10. The provenance method of claim 7, wherein the sets are serialized for traversal by replay such that the logs of each of the plurality of eidetic systems are not exchanged to another eidetic system of the plurality of eidetic systems during the crawling.

11. The provenance method of claim 7, wherein the sets are serialized for traversal by rollback such that the logs of each of the plurality of eidetic systems are not exchanged to another eidetic system of the plurality of eidetic systems during the crawling.

12. The provenance method of claim 7, wherein the sets are serialized for traversal to play a different timeline such that the logs of each of the plurality of eidetic systems are not exchanged to another eidetic system of the plurality of eidetic systems during the crawling.

13. A non-transitory computer-readable recording medium recording a provenance program for a plurality of eidetic systems having logs, the program causing a computer to perform:
   crawling the logs of each node of a plurality of nodes of the eidetic systems to cluster segments across the logs of temporally correlated events into clustered segments; and
   analyzing the correlated segments to interleave an order of processes in the logs and assign a probability to the order of the processes occurring while keeping the logs of each node of the plurality of nodes separate to their respective eidetic system,
   wherein each node of the plurality of nodes of the eidetic systems independently logs only local events, and
   wherein, during the analyzing of the correlated segments, the order of processes in the logs are interleaved using a clock-drift analysis between the provenance system and each of the plurality of eidetic systems,
   further comprising preventing an exchange of the logs of each of the plurality of eidetic systems to another eidetic system of the plurality of eidetic systems during the crawling by conditioning an output of the logs and, through observation, updating a probability tree for each set of events in the clustered segments by serializing these sets for traversal.

14. The non-transitory computer-readable recording medium of claim 13, further comprising, in response to a probabilistic lineage query, allowing a user to crawl all possible histories of the logs based on a result of the analyzing.

15. The non-transitory computer-readable recording medium of claim 13, further comprising performing a global ordering of the logs based on a result of the analyzing.

16. The non-transitory computer-readable recording medium of claim 13, wherein the sets are serialized for traversal by replay such that the logs of each of the plurality of eidetic systems are not exchanged to another eidetic system of the plurality of eidetic systems during the crawling.

17. The non-transitory computer-readable recording medium of claim 13, wherein the sets are serialized for traversal by rollback such that the logs of each of the plurality of eidetic systems are not exchanged to another eidetic system of the plurality of eidetic systems during the crawling.

18. The non-transitory computer-readable recording medium of claim 13, wherein the sets are serialized for traversal to play a different timeline such that the logs of each of the plurality of eidetic systems are not exchanged to another eidetic system of the plurality of eidetic systems during the crawling.

* * * * *